A. J. DILLEY.
PUMP.
APPLICATION FILED MAY 10, 1915.

1,198,898.

Patented Sept. 19, 1916.

Witnesses:
A. A. Hammond
Frank H. Borden

Inventor:
Arzeno J. Dilley
By Louis Bagger & Co.
His Attys.

UNITED STATES PATENT OFFICE.

ARZENO J. DILLEY, OF MUIR, MICHIGAN, ASSIGNOR OF ONE-HALF TO FRED W. GREEN, OF IONIA, MICHIGAN.

PUMP.

1,198,898.  Specification of Letters Patent.  Patented Sept. 19, 1916.

Application filed May 10, 1915. Serial No. 27,285.

*To all whom it may concern:*

Be it known that I, ARZENO J. DILLEY, a citizen of the United States, residing at Muir, in the county of Ionia and State of Michigan, have invented certain new and useful Improvements in Pumps, of which the following is a specification.

This invention relates to an improvement in grease pumps, and the object is to provide means for removing grease and the like from cans or pails and conducting it to the parts to be lubricated.

The invention consists of certain novel features of construction and combinations of parts which will be hereinafter described and pointed out in the claims.

Figure 1:
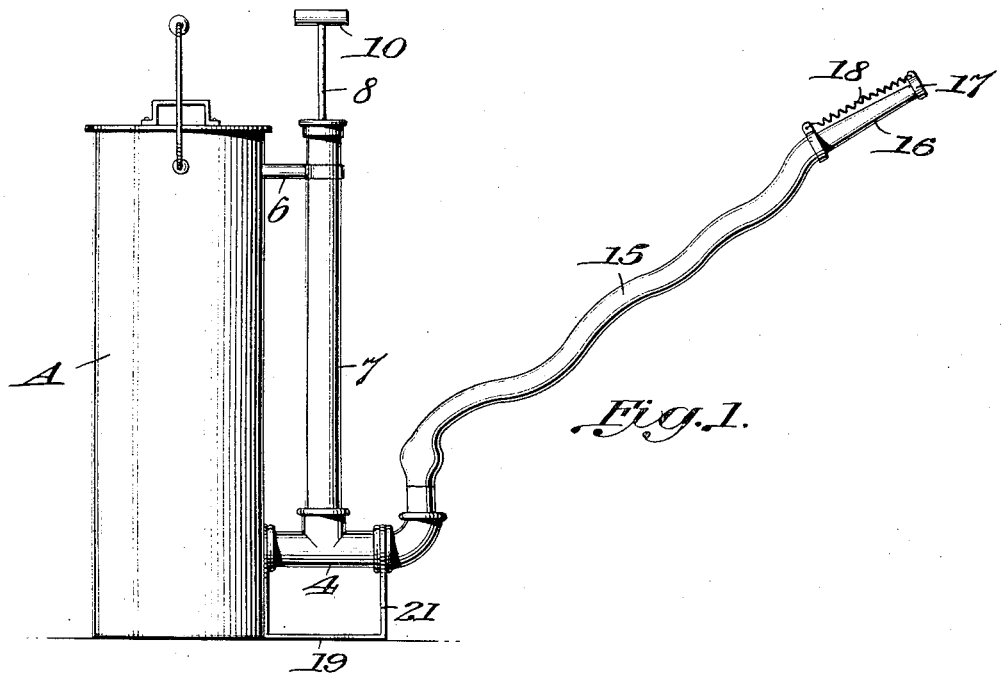
Figure 2:
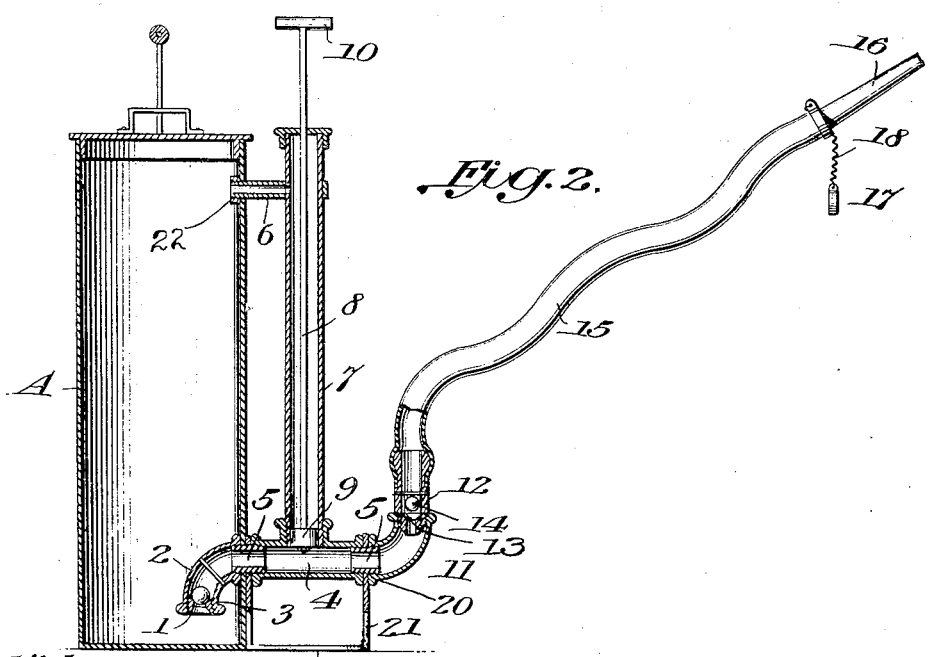

In the accompanying drawings:—Figure 1 is a view in elevation; and Fig. 2 is a longitudinal vertical sectional view.

A, represents the can or pail, in which a lubricant, grease or the like is received. Connected to the inner wall of the can or pail is an elbow or tube 2, which is provided with a ball valve 1. The valve being held in the tube by means of a screw-threaded seat 3, which has screw-threaded engagement with the tube. A pipe 4 has screw-threaded engagement with the tube, by means of a nipple 5, which passes through the wall of the can and into the tube. Connected to the pipe 4 is a pump 7, in which is mounted a piston 9. The piston has a rod 8 connected thereto which extends through the top of the casing, and is provided with a handle 10 for operating the piston. A tubular member 6 connects the upper end of the pump 7 to the can A, so that any grease or lubricant which may pass between the casing and piston can be returned to the can through the tubular member 6. The member 6 is connected to the can by means of a nut 22. An elbow or tube 11 is connected to the other terminal of the pipe 4 by a nipple 5. Connected to the terminal of the elbow or tube 11 is a coupling 12. This coupling is provided with a valve seat 13 on which a ball valve 14 is normally seated for preventing the discharge of grease from the pipe or can unless under pressure of the out-flowing grease.

A hose or tubing 15 is connected to the coupling 12, and a nozzle 16 is connected to the hose. A cap 17 is adapted to be placed over the nozzle when not in use to prevent any lubricant which may be in the hose from passing therefrom. A spring 18 is connected to the cap for maintaining it upon the end of the nozzle.

A U-shaped brace or foot support 19 is provided with openings 20 in the ends 21. These angular portions 21 are connected to the pipe 4, by the nipples 5 passing through the openings 20, confining one of the ends 21 of the U-shaped brace between the can A and an end of the pipe 4, and the other portion 21 between the other end of the pipe 4 and elbow 11. The lower or central portion of the foot-rest 19 is parallel to or in the same plane with the bottom of the pail or can A, so that when the pump is operated the can will not be tilted.

When the pump is to be operated, the foot of the operator is placed upon the foot-rest 19, and then the piston is reciprocated, causing the ball valve 1 to open and the valve 14 to close as the piston moves upwardly, drawing the grease into the pipe 4, and on the downward movement of the piston, the valve 2 closes preventing the grease from being forced back into the can. The valve 14, however, is caused to open on the downward movement of the piston, and the grease in the pipe 4 is forced past the valve and through the hose to the nozzle when it is introduced into or on the parts to be lubricated.

This apparatus has been found to work satisfactorily on heavy transmission grease, and it will be readily seen that with an apparatus of this character the transmission and other parts of an automobile or other machine can be readily lubricated.

I claim:

1. The combination with a receptacle having an opening adjacent to the bottom thereof, of a pump, a substantially T-shaped member connecting the pump and the receptacle, and a substantially U-shaped foot member connected to the T-shaped member and located directly beneath and approximately in vertical alinement with the center of the pump.

2. The combination with a receptacle having upper and lower openings in the side walls thereof, of a pump, a substantially T-shaped member, connected to the lower end of the pump, one end of which is adapted to register with one of the openings in the pump, elbows attached to the ends of the T-shaped member, one of which is adapted to project inwardly into the receptacle, valves arranged in each for controlling the admission to and the discharge of grease from said pump, and a supporting member surrounding the upper part of said pump and adapted to register with the other opening in the receptacle, said supporting member having an opening therein communicating with the pump and receptacle, whereby grease which leaks into the pump may be discharged back into said receptacle.

In testimony whereof I affix my signature, in the presence of two witnesses.

ARZENO J. DILLEY.

Witnesses:
 FLORENCE DILLEY,
 WM. H. DILLEY.